United States Patent [19]

Bazin

[11] 3,831,056

[45] Aug. 20, 1974

[54] BEAM CURRENT STABILIZATION AND BLANKING APPARATUS

[75] Inventor: Lucas John Bazin, Stratford, N.J.

[73] Assignee: RCA Corporation, New York, N.Y.

[22] Filed: Apr. 6, 1973

[21] Appl. No.: 348,621

[52] U.S. Cl. .......... 315/30, 178/7.5 R
[51] Int. Cl. .......... H01j 29/70
[58] Field of Search .......... 315/20, 18, 27 TD, 30, 315/27 R, 31; 178/7.2, 7.5 R

[56] References Cited

UNITED STATES PATENTS

| | | | |
|---|---|---|---|
| 3,414,667 | 12/1968 | Tanner | 315/30 |
| 3,466,390 | 9/1969 | Inamiya et al. | 315/30 |
| 3,678,191 | 7/1972 | Peters | 315/30 |

*Primary Examiner*—Maynard R. Wilbur
*Assistant Examiner*—J. M. Potenza
*Attorney, Agent, or Firm*—Eugene M. Whitacre; Charles I. Brodsky

[57] ABSTRACT

That portion of the beam current of a television pick-up tube which is collected by its limiting aperture grid is sensed to provide a feedback voltage for the control grid to stabilize against beam current variations. The cathode electrode is not incorporated within the current stabilization loop, and can thus be gated to provide the desired target-to-cathode bias voltage during the active interval of the scanning beam and to blank the beam during retrace intervals.

9 Claims, 1 Drawing Figure

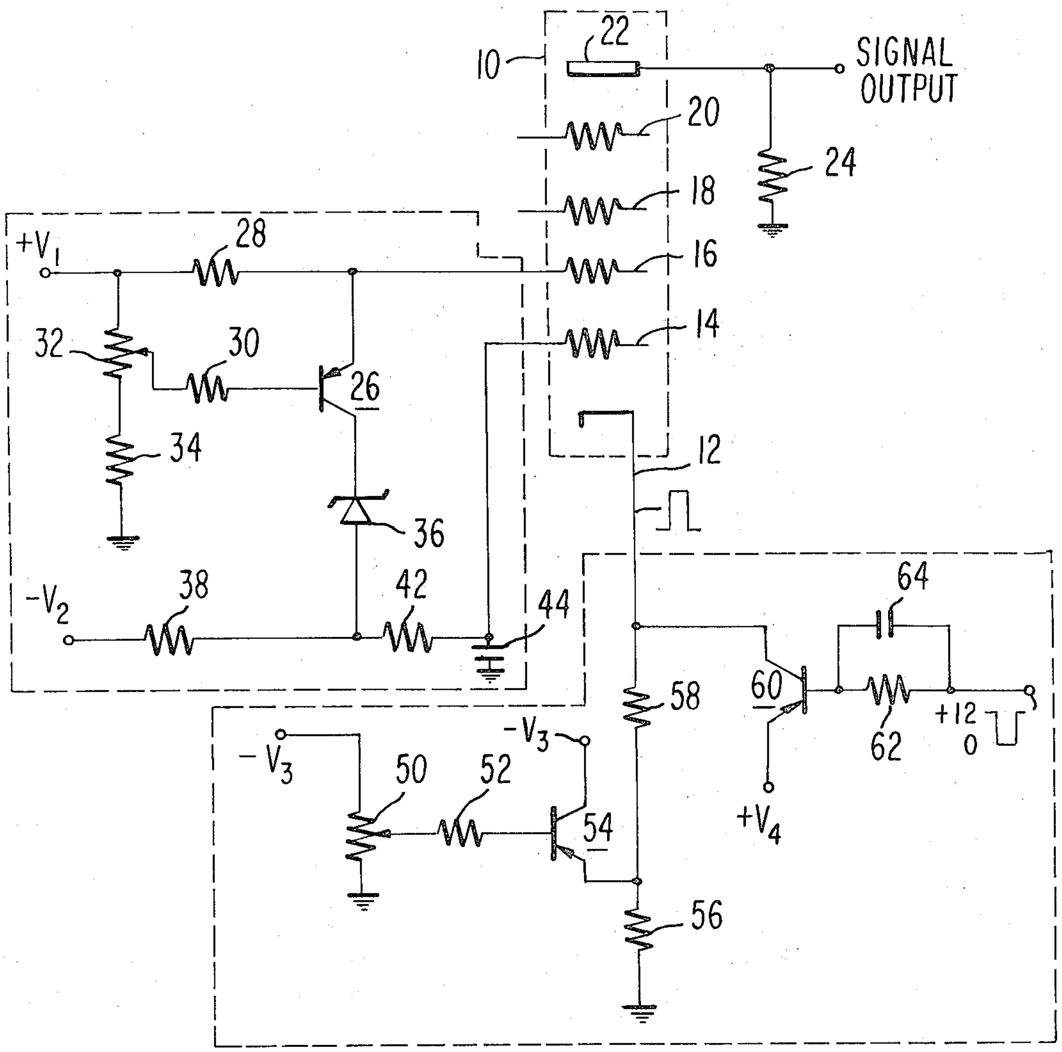
10
22
SIGNAL
OUTPUT
20
24
18
16
14
+V1
28
32
30
26
34
36
12
-V2
38
42
44
64
60
58
62
+12
0
-V3
-V3
50
52
54
+V4
56

BEAM CURRENT STABILIZATION AND BLANKING APPARATUS

FIELD OF THE INVENTION

This invention relates to television camera tube systems, in general, and to beam current stabilization and blanking apparatus therefor, in particular.

SUMMARY OF THE INVENTION

As will become clear hereinafter, the apparatus of the present invention differs from previously employed beam current stabilization constructions in its sensing of the current collected by the limiting aperture grid of the pick-up tube to alter control grid voltages, rather than in its sensing of variations in cathode current. That is, whereas previous designs have incorporated the cathode in a feedback network to prevent beam current drift and allow good picture quality both during the warm-up time of a television camera tube and during its life, the stabilization afforded by the present invention permits the cathode electrode to be excluded from the control loop.

As will also become clear, this omission permits the cathode to be used in blanking control operations, in which the target-to-cathode bias voltage is established by means of a cathode potential source during the active scanning interval of the beam, and in which a voltage clamp is employed to blank the beam during retrace intervals. As will be seen, this inclusion of the cathode electrode in a separate functional environment permits an automatic target control mode of operation to be incorporated for the pick-up tube, in accordance with which the amplitude of video signal developed is maintained within prescribed limits. As will further be seen, this blanking of the cathode during retrace intervals is prevented from affecting the beam current stabilization afforded, thereby permitting the stabilization control to continue without detrimental effect after the blanking interval ends and the scanning interval begins anew.

BRIEF DESCRIPTION OF THE DRAWING

These and other features of the present invention will be more clearly understood from a consideration of the following description taken in connection with the accompanying drawing which shows one embodiment of beam current stabilization and blanking apparatus constructed in accordance with the invention.

DETAILED DESCRIPTION OF THE DRAWING

In the drawing, the television camera pick-up tube is represented by the reference numeral 10, and may be of vidicon, plumbicon, or other appropriate construction. The cathode electrode of the tube 10 is denoted by the reference notation 12, while the control grid and the limiting aperture grid are identified by the numerals 14, 16, respectively. The focusing anode, the accelerating anode and the target electrode of the tube are shown as 18, 20, and 22, with the signal output from the tube 10 being developed across a resistor 24 connected between the target 22 and a point of reference or ground potential.

Considering the beam current stabilization feature of the present invention, it will be seen that a transistor, a zener diode, and five resistors are included. In particular, the emitter electrode of transistor 26 (illustrated as being of PNP construction) is connected to the limiting aperture grid 16, and by way of resistor 28 to a source of positive operating potential $+V_1$. The base electrode of transistor 26 is coupled to receive a bias potential from this source, via resistor 30 and the upper portion of resistor 32 (shown as being variable), with the bottom portion of the resistor 32 serving to complete the voltage divider for the base electrode by means of the fourth resistor 34 referenced to ground. The collector electrode of transistor 26, on the other hand, is connected to the cathode electrode of zener diode 36, the anode electrode of which is connected, first, to the control grid 14 of the camera tube 10 and, second, by the remaining resistor 38 to a source of negative operating potential $-V_2$.

As will be appreciated, the limiting aperture grid 16 serves to collect approximately 99 percent of the beam current which flows from cathode 12 towards target 22. Changes that may arise in beam current as the picture tube 10 warms up during its operation and over the course of its lifetime can thus be sensed in the grid 16 circuit to provide a varying voltage across resistor 28.

In operation, the beam control resistor 32 is initially set to establish the desired grid-cathode bias for the picture tube 10, and thereafter left alone. Variations in beam current are then sensed by the resistor 28--to develop changes in the base-emitter voltage of transistor 26 to affect its collector current and the resulting direct voltage developed at the junction of diode 36 and resistor 38, i.e., at the control grid electrode 14. A feedback network is therefore established, in that increases in cathode current produce decreases (less positive) in the emitter voltage of transistor 26 which produce corresponding decreases in collector current. Such decreases cause the control grid voltage to become more negative to, in essence, restore the cathode current to its original value in order to achieve the beam current stabilization.

It should be noted that the controlling element of the cathode current for this circuit, as in previously employed designs, is the control grid voltage. However, as distinct from previously employed constructions (see, for example, U.S. Pat. No. 2,949,561 —Wiggin), the cathode electrode is not included within the feedback path so that other types of control may be effectuated with it. As will be seen below, to permit such additional cathode control to have substantially little effect on the beam current stabilization, a resistor and a capacitor may be included within the feedback network to provide a time constant delay to the voltage changes for the control grid electrode. Such time constant network may include a sixth resistor 42 having one terminal coupled to the junction of zener diode 36 with resistor 38 and a second terminal connected to the control grid 14, with the capacitor 44 serving to couple that second terminal to ground.

The beam current blanking portion of the invention, on the other hand, includes two transistors (also of PNP type), four resistors and a capacitor. A target control potentiometer 50 is shown coupled between a second source of negative operating potential $-V_3$ and ground, with its variable arm being coupled by a resistor 52 to the first of these transistors 54. The collector electrode of transistor 54 is also connected to the $-V_3$ potential source, while the emitter electrode of this semiconductor device is referenced to ground by a resistor 56. The emitter electrode of transistor 54 is further coupled by a resistor 58 to the cathode electrode 12 of the television pick-up tube and to the collector electrode of the second transistor 60. The emitter electrode of this transistor is directly connected to a second source of positive operating potential $+V_4$, while the remaining resistor 62 and the capacitor 64 are connected in parallel to couple the base electrode of transistor 60 to an input control terminal at which target blanking pulses are applied.

In its operation —and with the target 22 referenced to a point of DC ground —the control 50 of the blanking apparatus is adjusted to establish a sufficient negative voltage at the cathode electrode 12 as will establish the proper target-to-cathode voltage to attract emitted electrons in providing the scanning beam to develop the camera signal output. Such signal is typically AC coupled from the resistor 24 to an input amplifier stage. During the active scanning time of the electron beam, transistor 60 is nonconductive, whereas transistor 54 conducts as an emitter-follower stage in setting the desired voltage condition. During the desired blanking interval, however, negative-going pulses are applied to resistor 62 and capacitor 64 to render transistor 60 conductive, and to saturate it so that the cathode electrode 12 is essentially connected to the positive potential $+V_4$ source in a direction to blank the tube.

As will be seen, the sudden decrease in beam current is sensed by the stabilization apparatus, but the time constant network afforded by resistor 42 and capacitor 44 serves to prevent the feedback network from changing the control grid bias in an offsetting manner. During this retrace interval, the scanning beam is blanked and no output signal is developed across resistor 24. Upon termination of the blanking interval, the applied triggering pulse ends, transistor 60 becomes nonconductive once again, and the bias condition established by the control 50 is once again applied. As will be appreciated, the stabilization voltage afforded grid 14 will continue at the same level established during the longer period scanning time of the cathode beam.

Thus, the blanking apparatus serves to provide a positive-going pulse on the cathode 12 of tube 10 to blank the target signal during the retrace interval. The precise pulse amplitude is determined by the setting of the control potentiometer 50, whose DC voltage from the source $-V_3$ is applied to the cathode 12 through transistor 54. During the retrace interval, the applied negative pulses serve to clamp the cathode 12 to the emitter potential of transistor 60, which is driven to saturation by the blanking pulses.

As will be appreciated, this sort of blanking control permits easy usage of an automatic target control signal developed from resistor 24. More particularly, the video amplitude there developed can be compared against a direct current reference in limiting the peak signal amplitude for application to the video processing stages of the picture tube circuitry. Whenever the video amplitude exceeds the pre-established direct current reference voltage, a control signal can be developed to alter the voltage which is applied at the uppermost terminal of the control potentiometer 50. By coupling that additional control voltage at this point, the target-to-cathode potential can be simply adjusted, automatically, in a portion of the circuitry at which little capacity exists to cause transient responses and the problems which such characteristics could otherwise introduce.

While applicant does not wish to be limited to any particular set of values, the following have proved useful in an embodiment of the invention incorporated in the TK–28 broadcast color film camera manufactured by the RCA Corporation of Camden, N.J.

| | |
|---|---|
| Resistor 28 | 10 kilohms |
| Resistor 30 | 100 ohms |
| Resistor 32 | 50 kilohms |
| Resistor 34 | 1.21 meg. 1% |
| Resistor 38 | 470 kilohms |
| Resistor 42 | 100 kilohms |
| Resistor 50 | 10 kilohms |
| Resistor 52 | 330 ohms |
| Resistor 56 | 10 kilohms |
| Resistor 58 | 1 kilohm |
| Resistor 62 | 1 kilohm |
| Capacitor 44 | .22 μf |
| Capacitor 64 | 390 pf |
| Transistor 26 | 2N5416 |
| Transistor 54 | 2N4888 |
| Transistor 60 | 2N4888 |
| Zener diode 36 | 1N5281 |
| Potential source $+V_1$ | +285 volts |
| Potential source $-V_2$ | −160 volts |
| Potential source $-V_3$ | −60 volts |
| Potential source $+V_4$ | +6 volts |

While there has been described what is considered to be a preferred embodiment of the present invention, it will be readily appreciated that other modifications may be made by those skilled in the art without departing from the teachings herein of stabilizing the beam current of a television pick-up tube by a feedback network connected between its limiting aperture and control grids and by blanking its beam current during retrace intervals through an independent clamping of the cathode electrode potential, the target potential being otherwise maintained at a substantially fixed value. It will also be readily apparent that the beam stabilization feature of the invention continues even though the target-to-cathode bias on the pick-up tube varies, either manually through adjustment of the control 50 or automatically by virtue of the automatic target compensating scheme.

What is claimed is:

1. Apparatus for controlling the electron scanning beam of a television camera tube having cathode, control grid, limiting aperture and target electrodes, comprising:

first means providing a bias voltage between the control grid and cathode electrodes of said camera tube to produce a beam current flow between said cathode and target electrodes;

second means coupled to said limiting aperture electrode for sampling a portion of the beam current collected by said aperture electrode and to provide a voltage corresponding thereto, representative of the beam current flow at a given instant of time; and third means coupling said voltage sample to the control grid of said tube, and in an opposite polarity, to adjust the control grid-cathode bias voltage in a direction to offset variations in beam current flow during the warm-up time of said television camera tube and over the course of its lifetime, in stabilizing said beam current, the magnitude of said voltage sample coupled to the control grid of said tube being also variable as said beam current varies.

2. The apparatus of claim 1 for use with a television camera tube having a target electrode referenced to a point of direct reference potential, and wherein said first means provides a source of variable negative voltage to said cathode electrode for adjusting the target-to-cathode bias to attract said beam current flow from said cathode electrode.

3. The apparatus of claim 2 wherein said first means further provides a source of fixed negative voltage to said control grid electrode for establishing said control grid-cathode bias, said fixed negative voltage being augmented by said voltage sample corresponding to beam current changes reflected at said limiting aperture electrode.

4. The apparatus of claim 2 wherein there is also included fourth means for clamping the cathode electrode of said camera tube to a positive voltage during predetermined intervals of electron beam scanning to block the current flow between said cathode and target electrodes in blanking said beam.

5. The apparatus of claim 4 wherein said fourth means provides pulse signals to clamp said cathode electrode during the retrace intervals of the electron beam scanning of said television camera tube.

6. The apparatus of claim 4 wherein said third means includes a delay network for insensitizing the voltage sample coupled to said control grid electrode during said retrace intervals.

7. Apparatus for controlling the electron scanning beam of a television camera tube having cathode, control grid, limiting aperture and target electrodes, comprising:

first, second and third sources of operating potential;

a transistor having emitter, base and collector electrodes;

a zener diode having an anode electrode and a cathode electrode directly connected to the collector electrode of said transistor;

a direct current connection between the emitter electrode of said transistor and the limiting aperture electrode of said television camera tube;

a first resistor coupling said first source of operating potential to the emitter electrode of said transistor;

a second resistor coupling said second source of operating potential to the anode electrode of said zener diode;

a third, variable resistor and a fourth resistor serially coupling said first source of operating potential to a point of reference potential;

a fifth resistor coupling the arm of said variable resistor to the base electrode of said transistor;

a direct connection between said third source of operating potential and the cathode electrode of said camera tube; and means coupling the junction between said second resistor and the anode electrode of said zener diode to said control grid.

8. The apparatus of claim 7 for use with a television camera tube having a target electrode referenced to a point of direct reference potential, and wherein said third source of operating potential is provided by a circuit comprising:

fourth and fifth sources of operating potential;

second and third transistors, each having emitter, base and collector electrodes;

direct current connections from the collector electrode of said second transistor to said fourth source of operating potential and from the emitter electrode of said third transistor to said fifth source of operating potential;

a sixth, variable resistor coupling said fourth source of operating potential to said point of reference potential;

a seventh resistor coupling the arm of said sixth, variable resistor to the base electrode of said second transistor;

eighth and ninth resistors serially coupling the collector electrode of said third transistor to said point of reference potential;

a direct connection between the emitter electrode of said second transistor and the junction between said eighth and ninth resistors; and wherein a direct connection at the junction between the collector electrode of said third transistor and said eighth resistor provides said third source of operating potential for said cathode electrode.

9. The apparatus of claim 8 wherein there is also included means for supplying control pulses to the base electrode of said third transistor during the retrace intervals of said electron beam scanning, to place said third transistor in a saturated condition wherein the cathode electrode of said television camera tube is clamped to the fifth source of operating potential connected to the emitter electrode of said third transistor.

* * * * *